US009586336B2

United States Patent
Mehta et al.

(10) Patent No.: US 9,586,336 B2
(45) Date of Patent: Mar. 7, 2017

(54) KICKBACK DETECTION SYSTEM

(71) Applicants: Robert Bosch Tool Corporation, Broadview, IL (US); Robert Bosch GmbH, Stuttgart (DE)

(72) Inventors: Amit Mehta, Itasca, IL (US); Juergen Wiker, Schaumburg, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 274 days.

(21) Appl. No.: 14/140,735

(22) Filed: Dec. 26, 2013

(65) Prior Publication Data

US 2014/0216220 A1    Aug. 7, 2014

Related U.S. Application Data

(60) Provisional application No. 61/747,845, filed on Dec. 31, 2012.

(51) Int. Cl.
*B27G 19/02* (2006.01)
*F16P 3/14* (2006.01)
*B27B 5/22* (2006.01)

(52) U.S. Cl.
CPC ............. *B27G 19/02* (2013.01); *B27B 5/222* (2013.01); *F16P 3/14* (2013.01); *Y10T 83/04* (2015.04); *Y10T 83/541* (2015.04)

(58) Field of Classification Search
CPC . B27G 19/02; B27B 5/222; F16P 3/14; Y10T 83/541; Y10T 83/04
See application file for complete search history.

(56) References Cited

U.S. PATENT DOCUMENTS

| | | | | |
|---|---|---|---|---|
| 3,715,946 A | * | 2/1973 | Kaltenbach | B23D 45/042 408/11 |
| 3,867,838 A | * | 2/1975 | Gerresheim | G01L 5/161 73/146 |
| 4,042,049 A | * | 8/1977 | Reichow | G01G 3/1406 177/137 |
| 4,045,919 A | * | 9/1977 | Moritomo | B24B 49/00 451/11 |
| 4,262,564 A | * | 4/1981 | Kaltenbach | B23D 47/08 409/146 |
| 4,267,914 A | * | 5/1981 | Saar | B23Q 11/04 173/181 |

(Continued)

FOREIGN PATENT DOCUMENTS

WO    01/26064 A2    4/2001

OTHER PUBLICATIONS

International Search Report and Written Opinion corresponding to PCT Application No. PCT/US2013/077773, mailed Apr. 14, 2014 (10 pages).

*Primary Examiner* — Sean Michalski
(74) *Attorney, Agent, or Firm* — Maginot Moore & Beck LLP

(57) ABSTRACT

A method of detecting a kickback event for a table saw includes operatively connecting a stress sensor to the table saw that is configured to detect a characteristic of a work component of the table saw, the work component being coupled to a workpiece being cut by the table saw during a cutting operation. The stress sensor outputs stress signals indicative of the characteristic of the work component. A speed of the saw blade is then controlled based on the stress signals.

20 Claims, 5 Drawing Sheets

(56) References Cited

U.S. PATENT DOCUMENTS

| | | | | |
|---|---|---|---|---|
| 5,669,250 A | * | 9/1997 | Dausch | D06F 39/088 |
| | | | | 68/12.02 |
| 6,412,381 B1 | * | 7/2002 | Wang | B23D 45/061 |
| | | | | 83/454 |
| 6,561,121 B1 | * | 5/2003 | Rose | G01K 13/08 |
| | | | | 116/216 |
| 6,715,390 B1 | * | 4/2004 | Flader | B27B 27/02 |
| | | | | 144/253.1 |
| 7,055,417 B1 | | 6/2006 | Gass | |
| 7,284,467 B2 | * | 10/2007 | Gass | B23D 59/001 |
| | | | | 83/471.2 |
| 2002/0017336 A1 | * | 2/2002 | Gass | B23D 59/001 |
| | | | | 144/2.1 |
| 2005/0145080 A1 | * | 7/2005 | Voigtlaender | B23D 59/005 |
| | | | | 83/58 |
| 2010/0037739 A1 | | 2/2010 | Anderson et al. | |
| 2011/0226105 A1 | * | 9/2011 | Butler | B27B 5/222 |
| | | | | 83/62 |
| 2012/0055302 A1 | * | 3/2012 | Tanaka | B27B 5/222 |
| | | | | 83/102.1 |

\* cited by examiner

KICKBACK DETECTION SYSTEM

CROSS-REFERENCE TO RELATED APPLICATIONS

This application claims priority to U.S. Provisional Application Ser. No. 61/747,845 entitled "KICKBACK DETECTION SYSTEM" by Amit Mehta et al., filed Dec. 31, 2012, the disclosure of which is hereby incorporated herein by reference in its entirety.

TECHNICAL FIELD

The present invention relates generally to power tools, and more particularly to a table saw.

BACKGROUND

A typical table saw includes a cutting instrument, usually a saw blade, attached to a motor mounted beneath a work surface, commonly called a table. The table has an opening that allows a portion of the blade to extend through the table. To make a cut, a user places material on the table and directs the material through the rotating blade. To assist users in making accurate cuts, many table saws are adapted to receive fences or material guides.

One type of fence commonly found on table saws is the rip fence. The rip fence, also known as a guide assembly, is a table saw guide that assists users in making lengthwise cuts through material, as when cutting wood along the grain. Most rip fences traverse the table parallel to the cutting direction of the blade. In order to make cuts of varying width, a user slides the fence along the table closer to or farther away from the blade. To ensure an accurate cut is made, the fence should be securely fastened to the table.

In some instances when cutting a workpiece, which includes materials such as solid wood or wood composites, an event known as "kickback" can occur. When kickback occurs, the workpiece can be unexpectedly thrown toward the front of the saw and toward the user. Kickback not only damages the workpiece in these situations, but can present work conditions which are to be avoided.

Kickback can occur when ripping a workpiece if the wood pinches the blade because of internal stresses which are inherent in the workpiece. In other situations, if the workpiece rises up from the table of the saw while cutting, kickback can also occur. In addition, kickback can occur if the workpiece is pinched between the blade and the rip fence. This condition most often occurs due to a misalignment of the rip fence with respect to the plane of the saw blade. In view of the foregoing, it would be advantageous to provide a system to monitor, detect and mitigate kickback in a table saw.

DESCRIPTION

Figure 1:
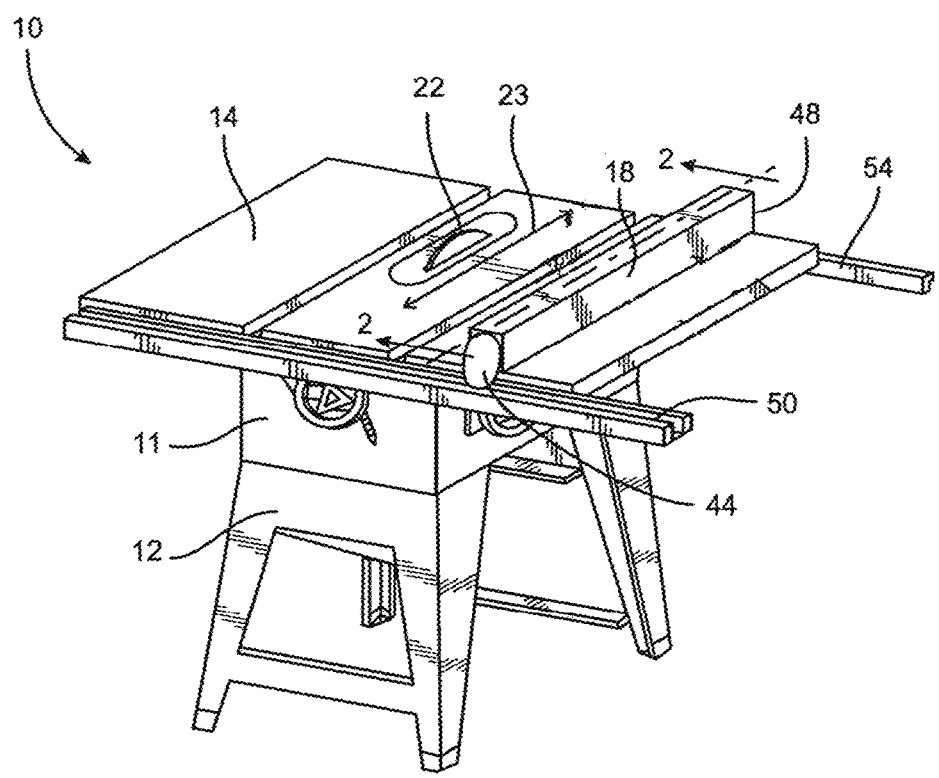
FIG. 1 a perspective of a table saw including a rip fence.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

According to one embodiment, a method of detecting a kickback event for a table saw is provided, the table saw including a motor having an arbor shaft for driving a saw blade. The method includes operatively connecting a stress sensor to the table saw that is configured to detect a characteristic of a work component of the table saw. The stress sensor outputs stress signals indicative of the characteristic of the work component. A speed of the saw blade is then controlled based on the stress signals.

In another embodiment, a kickback detection system for a table saw is provided. The kickback detection system includes a stress sensor configured to detect a characteristic of a work component of the table saw and to output stress signals indicative of the characteristic of the work component. A controller is operatively coupled to receive the stress signals from the stress sensor and to output a speed control signal based on the characteristic indicated by the stress signals. A speed control mechanism is operatively coupled to receive the speed control signal and configured to control a speed of the saw blade based on the speed control signal.

As used herein, a work component refers to a component of the table saw that is coupled to a workpiece being cut by the table saw during a cutting operation. For example, the work component may comprise the motor, the arbor shaft of the motor, and/or the saw blade driven by the arbor shaft. The work component may also comprise a guide fence for the table saw that the workpiece is pressed against during a cutting operation.

The stress sensor detects a characteristic of the work component which can indicate the occurrence of a kickback event. For example, the stress sensor may comprise a deflection sensor configured to detect a deflection of the work component, e.g., the arbor shaft and/or guide fence. The stress sensor may comprise a current sensor for detecting a current used by the motor. The stress sensor may also comprise a rotational speed sensor for detecting a rotational speed of the arbor shaft and/or saw blade.

The characteristic indicated by the stress signals may be compared a threshold value for the characteristic, and the speed of the saw blade may be adjusted based on the comparison. The threshold value corresponds to a value of the characteristic during a kickback event. The speed control mechanism may comprise the motor or a separate mechanism, such as a braking device. Adjusting the speed of the saw blade may comprise reducing the speed of the motor or actuating the braking mechanism to stop the motor and/or saw blade.

Referring now to the drawings, FIG. 1 is a perspective of a table saw 10 including a rip fence 18. The table saw 10 includes a base 12 that supports an enclosure 11. The enclosure 11 houses an electric motor having a shaft upon which a cutting tool, usually a blade 22, is mounted for rotation. A planar surface, commonly referred to as a table 14, is secured to the top of the enclosure 11. The table 14 is usually constructed of a rigid and flat material such as metal, plastic, or fiberglass. The blade 22 projects through an opening in the surface of the table 14. A fence guide 50 is located toward the front of the table 14 and a fence guide 54 is located toward the back of the table 14. The guides 50 and 54 in one embodiment are formed as part of the table 14 or in another embodiment are separate parts, each of which is coupled to the table 14 at the appropriate location.

The guides 50, 54, illustrated in perspective in FIG. 1, show generally the shape of such guides. In other embodiments, other configurations of the guides are possible. The guides 50, 54 traverse the width of the table 14 substantially perpendicular to a cutting direction 23 of the blade 22, where the material is moved from the front of the table to a back of the table.

The rip fence 18 includes a first lock mechanism 44 and a second lock mechanism 48 that are selectively moveable between a locked position and an unlocked position. When in the locked position, the first and second lock mechanisms 44, 48 engage the guides 50, 54 in such a manner that the fence 18 is secured to and fixed in place with respect to the table 14. When in the unlocked position, the first and second lock mechanisms 44, 48 disengage from the guides 50, 54 such that the rip fence 18 is free to slide along the table surface. The guides 50, 54 are constructed of a rigid material such as metal or plastic. The shape of the guides 50, 54 permits the rip fence 18 to be easily attached to and removed from the table 14, and also permits the fence 18 to slide across the surface of the table 14 for positioning by an operator or user of the table saw 10.

Figure 2:
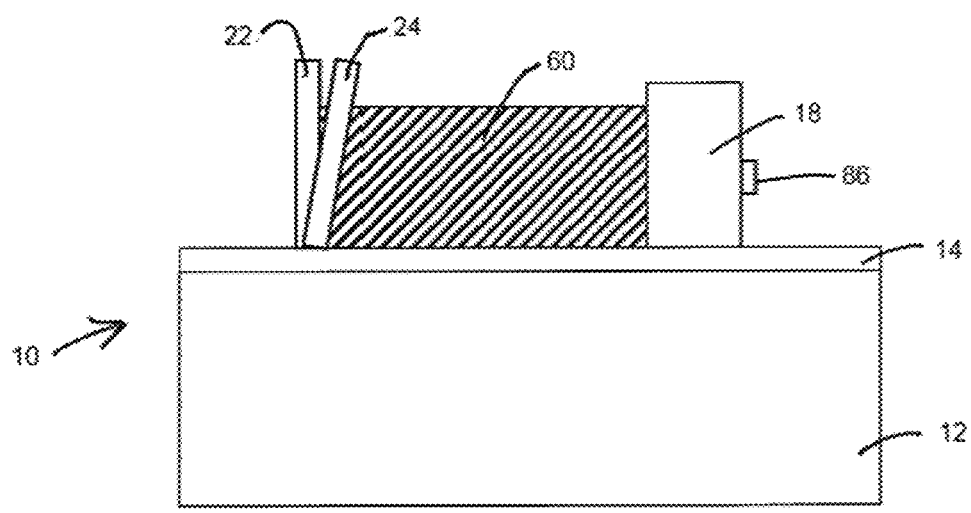
FIG. 2 is a schematic front view of a table saw and a saw blade experiencing stress in response to a kickback event.

FIG. 2 is a schematic front view of the table saw 10 in which the saw blade 22 experiences a stress in response to a kickback event. As illustrated, a workpiece 60 which is moving toward a user as illustrated causes a kickback event to the saw blade 22. As the saw blade experiences the kickback event, the blade 22 is often displaced from a normal operating position where the blade 22 is normally disposed substantially perpendicular to the table 14. When the blade 22 experiences stress due to a kickback event, the blade 22 is displaced in the illustrated embodiment from the substantially perpendicular position to a misaligned position of blade 24. (This position is exaggerated). The workpiece 60 becomes wedged or compressed between the blade and the rip fence 18 and experiences a kickback event.

Figure 3:
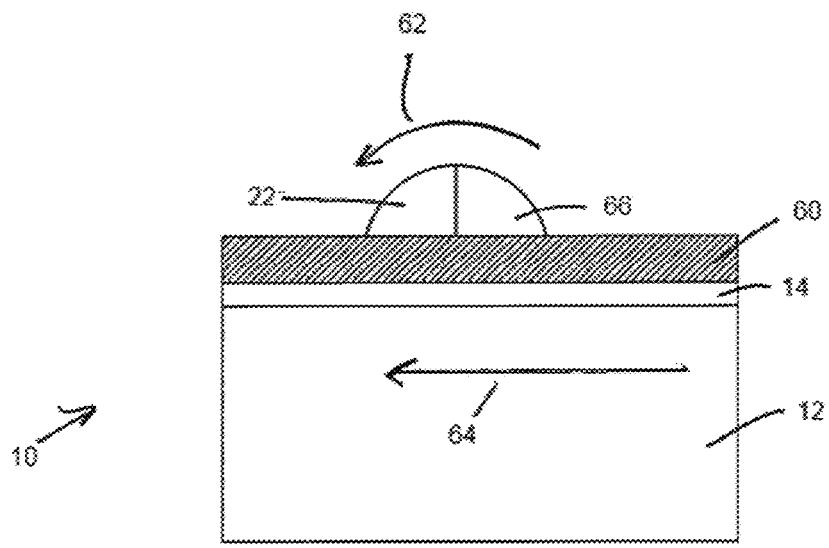
FIG. 3 is a side view of a table saw and a saw blade illustrating the location a stress applied to the saw blade during a kickback event.

FIG. 3 is a side view of the table saw 10 and the saw blade 22 rotating in a direction 62. The workpiece 60 is moving along the line 64 from right to left as illustrated. During a kickback event, the saw blade 22 experiences an initial stress in a first quadrant 66 located toward the back side of the table saw 10 thereby illustrating the location a stress applied to the saw blade during a kickback event. Because of the stress appearing in the quadrant 66, the workpiece 60 can be lifted from the surface of the table 14. Under certain conditions and if sufficiently elevated, the workpiece 60 leaves the top 14 and is thrown in the direction 64 thereby causing an undesirable work condition.

Figure 4:
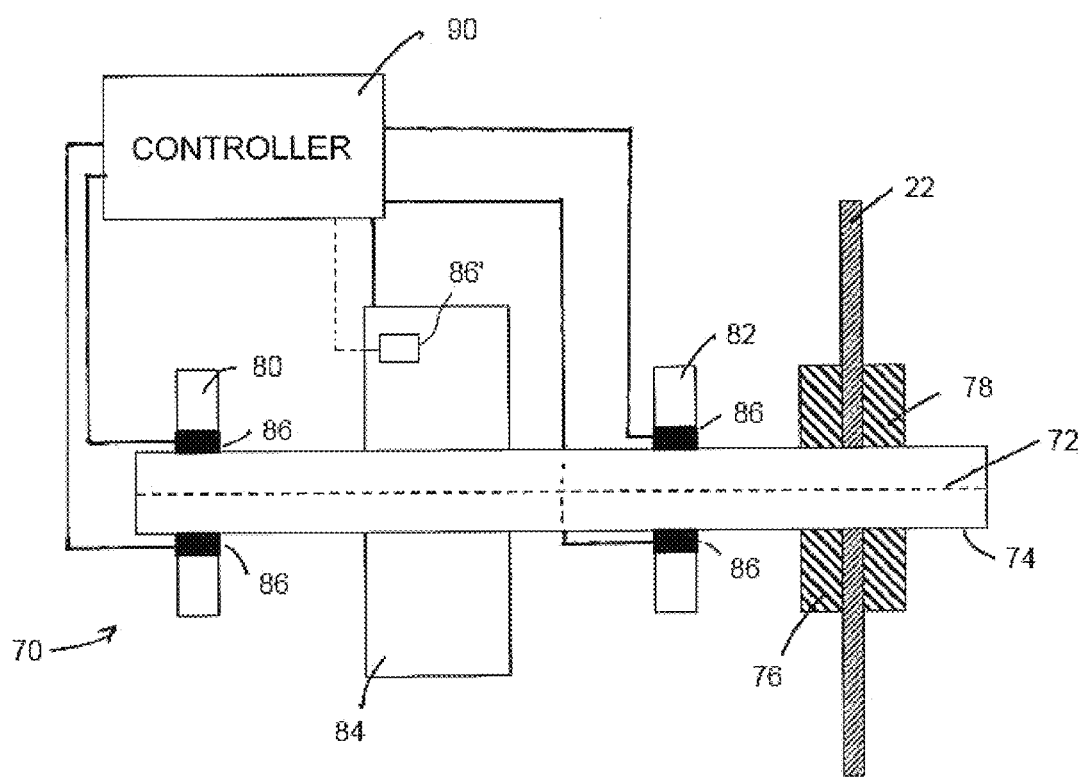
FIG. 4 is a schematic cross-sectional view of an arbor of the table saw rotatably supporting a saw blade.

FIG. 4 is a schematic cross-sectional view of an arbor 70 of the table saw 10 rotatably supporting the saw blade 22 about a longitudinal axis 72 of an arbor shaft 74. The saw blade 22 is disposed between an arbor flange 76 and arbor washer 78 which provide stable support for rotation of the blade 22 substantially perpendicular to the table top 14. Other positions of the blade 22 with respect to the table top are also possible. The arbor shaft 74 is supported for rotation by a first bearing 80 and a second bearing 82 each of which is disposed on opposite sides of a motor 84 configured to drive the arbor shaft 74 about the axis of rotation 72. The motor 84 includes known devices for rotation including direct drive motors, gear arrangements coupled to a motor, and belts driven by motors. A motor used in the motor 84 is typically an electric motor which operates in response to a predetermined voltage and current supplied by either alternating current or direct current supplies.

During a kickback event, the workpiece generates a kickback force that is transferred to the work components of the table saw, such as the saw blade, arbor shaft, motor, and guide fence. The kickback force can cause deflection of the saw blade 22 and in turn result in deflection of the arbor shaft of the motor, and cause deflection of the guide fence. The kickback force can also interfere with the rotation of the saw blade which can increase the load on the motor as well as alter the rotational speed of the blade.

To detect a kickback event, the table saw is provided with a kickback detection system that includes one or more stress sensors 86 for detecting characteristics of at least one work component indicative of the occurrence of kickback events. Referring to FIG. 4, in one embodiment, the stress sensors may be configured to detect the presence of a stress applied to the arbor shaft 74 during a kickback event.

As depicted in FIG. 4, stress sensors 86 may be disposed at one or both of bearings 80, 82 In FIG. 4, the stress sensors 86 comprise deflection sensors that are configured to detect a deflection of the work component, e.g., the arbor shaft 74, from a normal position or orientation. As depicted in FIG. 2, stress sensors 86 may also be provided to detect deflection of the rip fence 18 caused by kickback events. A deflection sensor may comprise any type of sensor capable of indicating or detecting a deflection of the arbor shaft, such as a strain gauge, a piezoelectric transducer, an accelerometer, and/or an optical sensor. In an alternative embodiment, stress sensors may be configured to detect the rotational speed of the arbor shaft 74 and/or the blade 22. Rotational speed may be detected in any suitable manner, such as by laser sensors and encoding devices.

The stress sensors 86 output stress signals indicating a value of the stress experienced by the work component. A controller 90 is operatively coupled to receive the stress signals from the stress sensors 86. The controller is configured to generate a speed control signal which is transmitted to a speed control mechanism. The speed control mechanism may comprise the motor 84, such that the speed control signal causes the motor to reduce speed and/or stop. Alternatively, the speed control mechanism may comprise a separate component, such as a switch or braking mechanism, associated with the motor that is capable of altering the speed of the motor and/or saw blade. For example, the speed control mechanism may comprise a solenoid operated switch (not shown) coupled to the power line of the motor which can be actuated to cut off power to the motor in response to the speed control signal. Alternatively or in addition to the switch, the speed control mechanism may comprise a brake (not shown) which is configured to stop the arbor shaft 74 and/or the blade 22 from rotating in response to the speed control signal.

In one embodiment, the controller is configured to compare the stress sensor output to threshold limits or values and to output the speed control signal based on the comparison.

The threshold values for sensed characteristics, such as deflection, current level, and rotational speed, are selected to correspond to the values of these characteristics during the occurrence of a kickback event and can be determined through trial and error or through simulation and modeling of system behavior.

Figure 5:
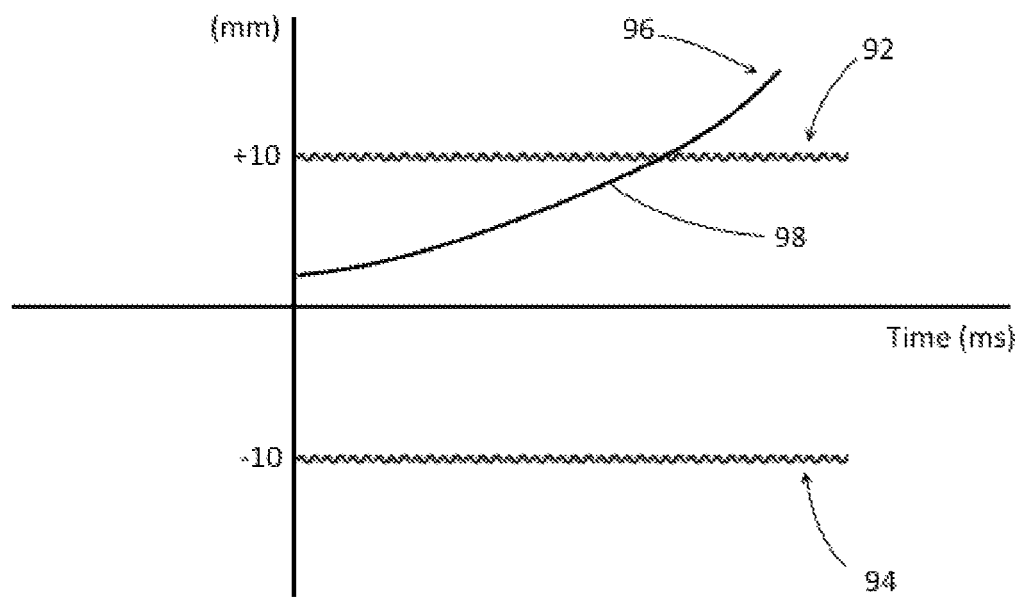
FIG. 5 is a graphical representation of a change in the load experienced by a saw blade when experiencing a kickback event as sensed by a strain gauge.

FIG. 5 is a graphical representation of a change in the load experienced by the saw blade 22 when experiencing a kickback event as sensed by the transducer 86 when embodied as a strain gauge. The graph of FIG. 5 illustrates that a deflection in the arbor shaft 74 is measured to determine the occurrence of a kickback event. The deflection is measured in millimeters (mm) over a period of time in this embodiment. A first and a second substantially horizontal line 92 and 94 respectively depict a first limit and a second limit in opposite directions of acceptable deflection. In one embodiment the first and second limits of acceptable deflection occur around 10 mm. The sensed deflection is determined based on an acceptable deflection of the arbor shaft 74 and/or blade 22, or the rip fence 18 in the case of the sensor 86 of FIG. 2. In either event, these limits are determined through trial and error or through modeling of the arbor system.

In the illustrated embodiment, a deflection signal 96 is illustrated crossing the line 10 mm line at a point 98. Once the point 98 is crossed, the controller 90 determines that a kickback event is possible and transmits a control signal to the driver 84 to control operation of the motor as previously described to reduce or eliminate the resulting effects of the kickback event.

Figure 6:
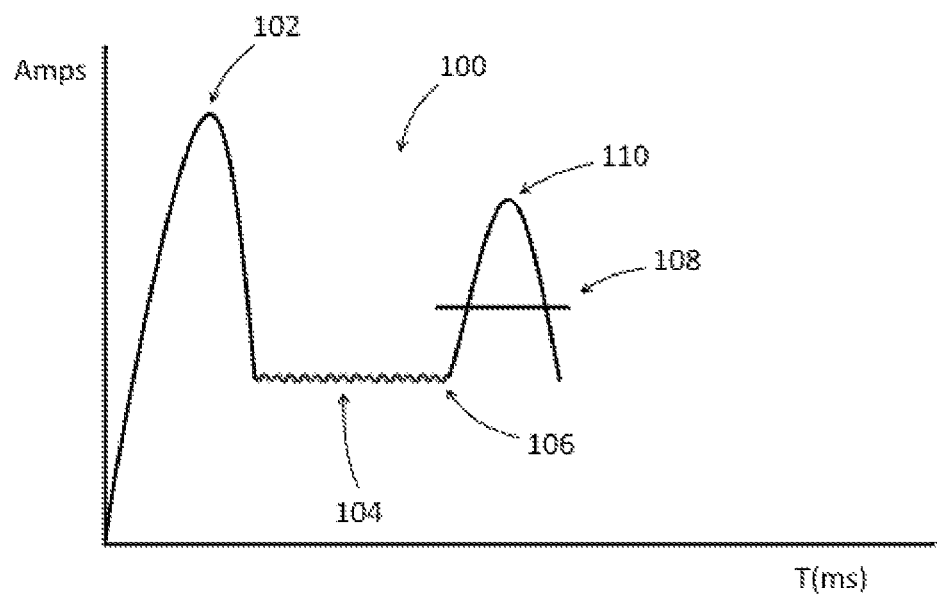
FIG. 6 is a graphical representation of a change in the load experienced by a saw blade when experiencing a kickback event as sensed by a current sensor.

As an alternative or in addition to stress sensors 86 in the form of deflection sensors, the kickback detection system may include a stress sensor 86' (FIG. 4) which comprises current sensor for measuring the amount of current being delivered to or used by the motor 84. This current to the motor is monitored as illustrated in FIG. 6, which depicts a graphical representation of a change in the load experienced by a saw blade 22 when experiencing a kickback. The change in the load is be determined by the current delivered to the motor. The current, illustrated as the waveform 100, is depicted as amps versus time in milliseconds.

Initially, when the blade 22 of table saw 10 is engaged to rotate prior to cutting the workpiece, the motor experiences an inrush of current at a point 102 which typically exceeds the amount of current delivered to the motor during a kickback event. Once the blade has reached operating speed, the inrush of current falls to a level 104 which is relatively stable until cutting of a workpiece begins at a point 106. The amount of current delivered to the motor continues to rise and remains relatively constant during cutting of the workpiece at a predetermined level of current 108. If a kickback event occurs, however, the current level rapidly increases above the predetermined level 108. Once the current level exceeds the predetermined level, the controller 90 generates the speed control signal to the speed control mechanism. The current level peaks to a point 110 upon which the level falls off due to the shutdown of the motor to prevent or substantially reduce the effects of a kickback event.

Figure 7:
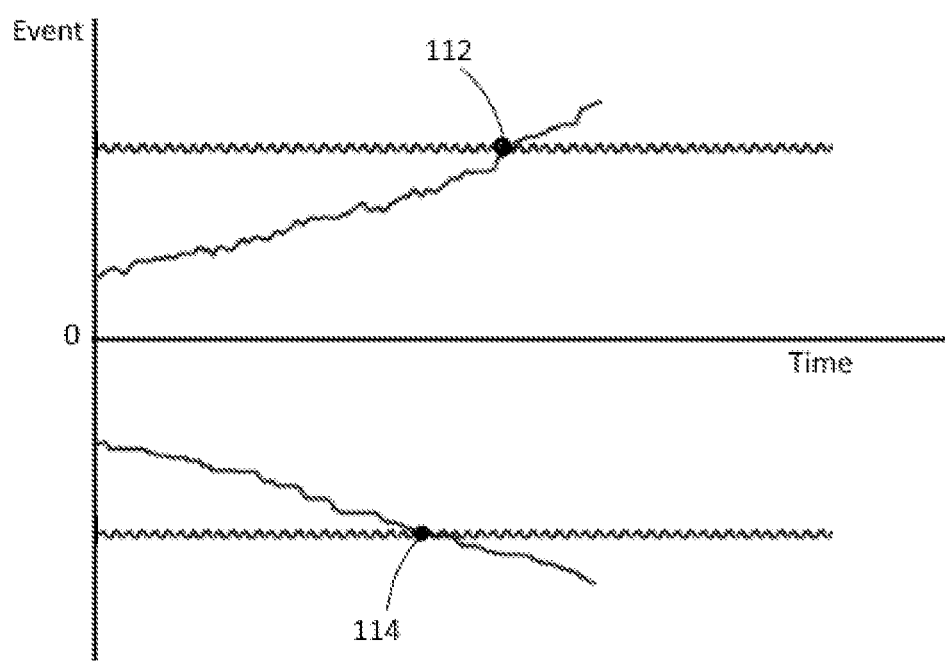
FIG. 7 is a graphical representation of a threshold event when the load experienced by a saw blade experienced during a kickback event crosses a predetermined threshold which shuts off a motor driving a saw blade.

FIG. 7 is a graphical representation of a threshold event signifying the occurrence of a kickback even when the load experienced by the saw blade 22 during a kickback event crosses a predetermined threshold at points 112 and/or 114. In this depiction the x axis signifies a time line as described above, but the y axis depicts a sensed value of a sensor experiencing a kickback event. The y axis is a deflection or current as previously described but also includes other types of sensing devices which used to detect the kickback event.

While FIG. 4 illustrates lines of communication between the controller 90, the sensors 86, and the driver 84, the lines of communication are not limited to physical wired connections. Other methods of signal transmission are also possible including wireless communication such as Bluetooth and infrared.

While the described embodiments have included either slowing down rotation of or stopping the saw blade 22, other methods of reducing or eliminating the effects of a kickback event include providing an audible notification of a potential kickback event which includes an audible alarm which buzzes, beeps or provides some other form of audible notification. In other embodiments, a visual alarm, such as flashing lights, is used either alone or in combination with the audible alarms.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A method of detecting a kickback event for a table saw, the table saw including a motor having an arbor shaft for driving a saw blade and a guide fence for guiding a workpiece, the method comprising:
   operatively connecting a stress sensor to the table saw, the stress sensor being configured to detect deflection of a work component during a cutting operation, the work component comprising at least one of the arbor shaft and the guide fence;
   outputting sensor signals from the stress sensor indicative of the deflection of the work component; and
   controlling the saw blade based on the sensor signals.

2. The method of claim 1, further comprising:
   comparing the deflection indicated by the sensor signals to a threshold value for the characteristic; and
   adjusting the speed of the saw blade based on the comparison.

3. The method of claim 2, wherein the threshold value corresponds to a value of the characteristic during a kickback event.

4. The method of claim 3, wherein adjusting the speed comprises reducing the speed of the motor in response to the deflection indicated by the sensor signals exceeding the threshold value.

5. The method of claim 3, wherein adjusting the speed comprises actuating a braking mechanism for stopping the saw blade in response to the deflection indicated by the sensor signals exceeding the threshold value.

6. The method of claim 1, wherein the stress sensor comprises a deflection sensor for indicating a deflection of the work component from a normal position.

7. The method of claim 6, wherein the deflection sensor comprises at least one of a transducer, a strain gauge, an accelerometer, and an optical sensor.

8. The method of claim 7, wherein the work component comprises the arbor shaft.

9. The method of claim 8, wherein the deflection sensor is connected to a bearing that rotatably supports the arbor shaft.

10. The method of claim 7, wherein the work component comprises the guide fence.

11. The method of claim 3, wherein the stress sensor comprises a current sensor, and wherein the sensor signals indicate a current being supplied to the motor, and wherein the threshold value corresponds to a current level supplied to the motor during a kickback event.

12. A kickback detection system for a table saw having a guide fence and a motor rotatably driving an arbor shaft supported by a bearing, the system comprising:

a stress sensor operatively connected to the table saw, the stress sensor being configured to detect deflection of a work component of the table saw during a cutting operation, the work component comprising at least one of the arbor shaft and the guide fence, the stress sensor outputting sensor signals indicative of the deflection of the work component;

a controller operatively coupled to receive the sensor signals from the stress sensor and to output a speed control signal based on the characteristic indicated by the sensor signals; and a speed control mechanism operatively coupled to receive the speed control signal and configured to control a speed of the saw blade based on the speed control signal.

13. The system of claim 12, wherein the controller is configured to compare the deflection indicated by the sensor signals to a threshold value for the characteristic and to output the speed control signal based on the comparison.

14. The system of claim 13, wherein the threshold value is selected to indicate a kickback event experienced by the work component.

15. The system of claim 14, wherein the speed control mechanism comprises the motor, the motor being configured to reduce speed in response to the speed control signal.

16. The system of claim 15, wherein the speed control mechanism comprises a braking mechanism configured to stop rotation of the saw blade in response to the speed control signal.

17. The system of claim 14, wherein the stress sensor comprises a deflection sensor for indicating a deflection of the work component from a normal position.

18. The system of claim 17, wherein the deflection sensor comprises at least one of a transducer, a strain gauge, an accelerometer, and an optical sensor.

19. The system of claim 18, wherein the work component comprises the arbor shaft.

20. The system of claim 18, wherein the work component comprises the guide fence.

* * * * *